(12) United States Patent
Veeramurthy et al.

(10) Patent No.: US 11,181,191 B1
(45) Date of Patent: Nov. 23, 2021

(54) TORQUE RATIO BOUNDS FOR AUTOMATIC TRANSMISSIONS

(71) Applicant: FORD GLOBAL TECHNOLOGIES, LLC, Dearborn, MI (US)

(72) Inventors: Gangarjun Veeramurthy, Sunnyvale, CA (US); Jason Meyer, Canton, MI (US); Jeffrey A. Doering, Canton, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/003,339

(22) Filed: Aug. 26, 2020

(51) Int. Cl.
| | |
|---|---|
| *F16H 59/14* | (2006.01) |
| *F16H 59/44* | (2006.01) |
| *F16H 59/40* | (2006.01) |
| *F16H 59/42* | (2006.01) |
| *F16H 61/02* | (2006.01) |
| *F16H 61/12* | (2010.01) |
| *F16H 59/70* | (2006.01) |
| *F16H 59/68* | (2006.01) |

(52) U.S. Cl.
CPC ........... *F16H 59/141* (2013.01); *F16H 59/40* (2013.01); *F16H 59/42* (2013.01); *F16H 59/44* (2013.01); *F16H 59/70* (2013.01); *F16H 61/0204* (2013.01); *F16H 61/12* (2013.01); *F16H 2059/6807* (2013.01); *F16H 2061/1208* (2013.01)

(58) Field of Classification Search
CPC ........ F16H 59/141; F16H 59/40; F16H 59/42; F16H 59/44; F16H 59/70; F16H 2059/6807; F16H 2059/467; F16H 61/0204; F16H 61/12; F16H 61/14; F16H 2061/1208; B60W 10/024; B60W 10/04; B60W 10/11

See application file for complete search history.

(56) References Cited

U.S. PATENT DOCUMENTS

| | | | |
|---|---|---|---|
| 5,658,213 A | * | 8/1997 | Sato ...................... B60W 10/06 475/125 |
| 6,434,466 B1 | | 8/2002 | Robichaux et al. |

(Continued)

FOREIGN PATENT DOCUMENTS

| | | |
|---|---|---|
| GB | 2534368 B | 7/2016 |
| JP | 3526955 B2 | 10/1996 |

*Primary Examiner* — Edwin A Young
(74) *Attorney, Agent, or Firm* — Vincent Mastrogiacomo; Brooks Kushman P.C.

(57) ABSTRACT

A vehicle includes a multi-speed transmission having an input shaft and an output shaft, an actuator, and a torque converter having an impeller selectively coupled to the actuator and a turbine coupled to the input shaft. A vehicle controller is programmed to, in response to an estimated torque ratio between the impeller and output shaft of the transmission being less than a minimum torque ratio between the impeller and output shaft of the transmission during a shift of the transmission, command torque to the actuator based on a driver-demanded wheel torque and the minimum torque ratio, and, in response to the estimated torque ratio exceeding the minimum torque ratio during the shift of the transmission, command another torque to the actuator based on the driver-demanded wheel torque and the estimated torque ratio.

20 Claims, 5 Drawing Sheets

(56) References Cited

U.S. PATENT DOCUMENTS

| | | | |
|---|---|---|---|
| 2009/0312927 A1* | 12/2009 | Ishiwada | F16H 59/72 701/60 |
| 2013/0345022 A1* | 12/2013 | Yanakiev | F16H 59/14 477/115 |
| 2016/0281616 A1* | 9/2016 | Hippalgaonkar | F02D 29/02 |

* cited by examiner

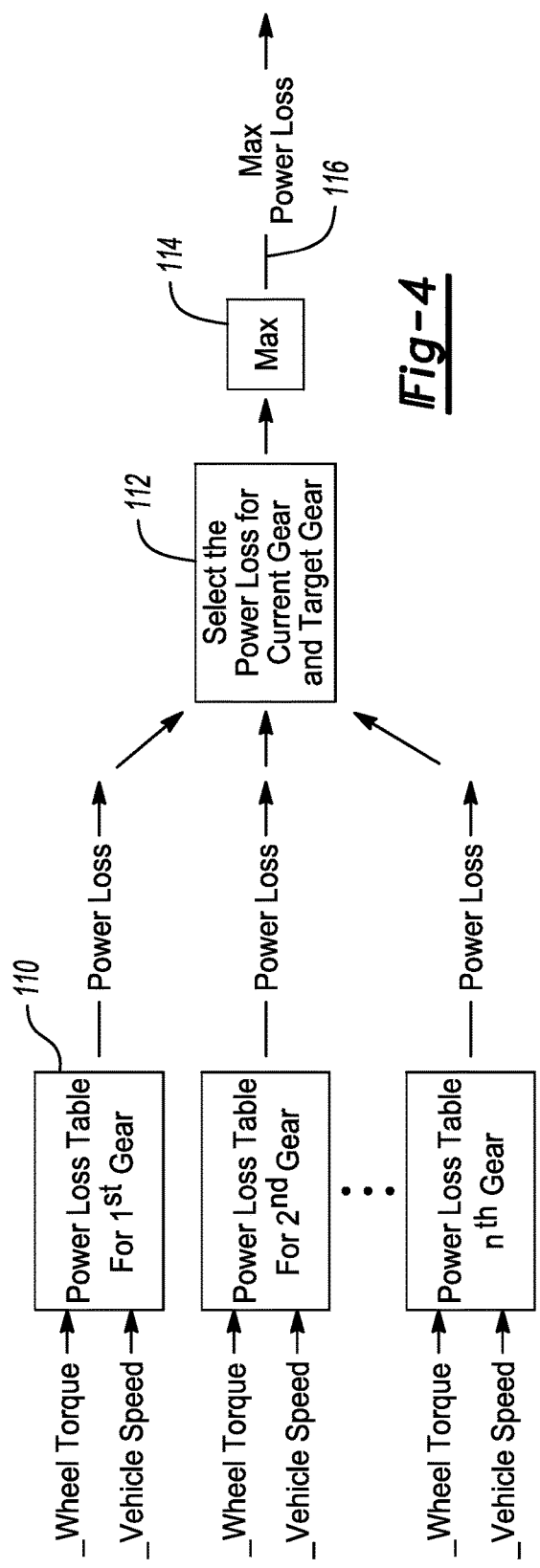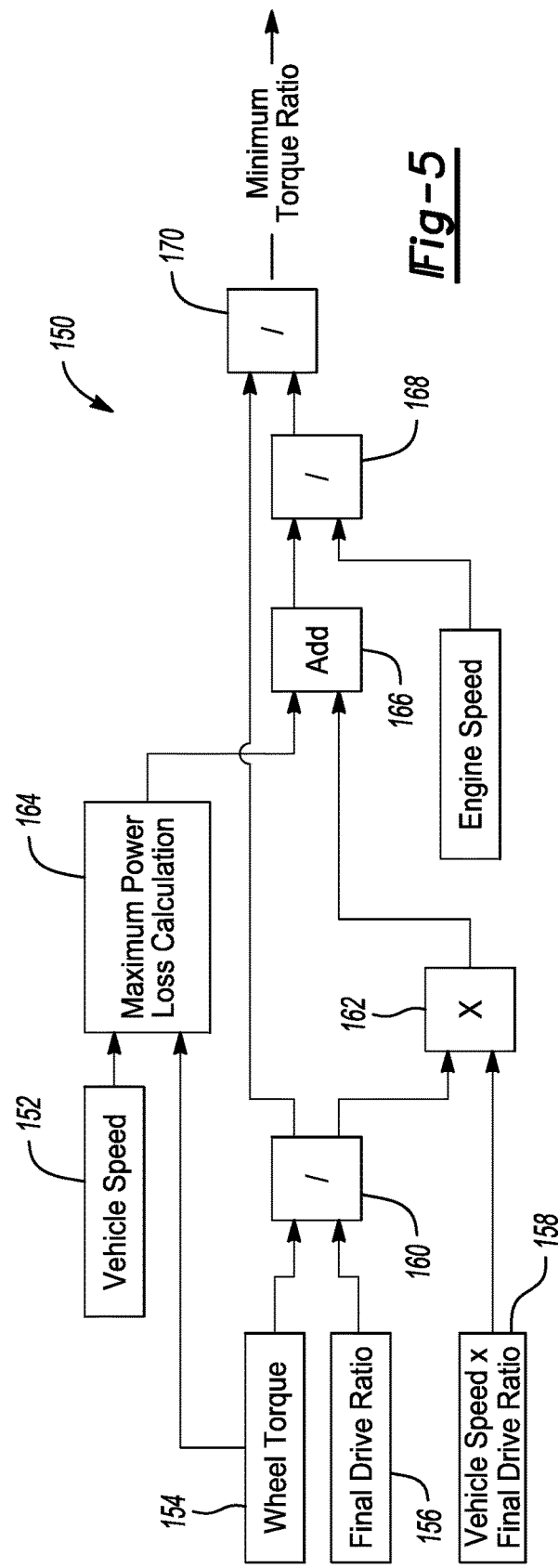

TORQUE RATIO BOUNDS FOR AUTOMATIC TRANSMISSIONS

TECHNICAL FIELD

This disclosure relates to transmission controls and more specifically to transmission controls of hybrid vehicles.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery.

SUMMARY

According to one embodiment, a vehicle includes a multi-speed transmission having an input shaft and an output shaft, an actuator, and a torque converter having an impeller selectively coupled to the actuator and a turbine coupled to the input shaft. A vehicle controller is programmed to, in response to an estimated torque ratio between the impeller and output shaft of the transmission being less than a minimum torque ratio between the impeller and output shaft of the transmission during a shift of the transmission, command torque to the actuator based on a driver-demanded wheel torque and the minimum torque ratio, and, in response to the estimated torque ratio exceeding the minimum torque ratio during the shift of the transmission, command another torque to the actuator based on the driver-demanded wheel torque and the estimated torque ratio.

According to another embodiment, a vehicle includes an actuator and a multi-speed transmission having an input shaft, an output shaft, and clutches selectively engageable to establish power flow paths between the input and output shafts. A torque converter associated with the transmission has an impeller selectively coupled to the actuator and a turbine coupled to the input shaft. A controller is programmed to receive a driver-demanded wheel torque and command the transmission to shift from a current gear to a target gear. The controller is further programmed to, in response to the shift, (i) receive current signals from solenoids associated with one or more of the clutches to verify engagement of the target gear, (ii) determine a first power loss through the torque converter for the current gear, (iii) determine a second power loss through the torque converter for the target gear, and (iv) determine a minimum torque ratio between the impeller and the output shaft of the transmission based on a maximum of the first and second power losses, and, in response to an estimated torque ratio between the impeller and the output shaft being less than the minimum torque ratio during the shift of the transmission, command torque to the actuator based on the driver-demanded wheel torque and the minimum torque ratio.

According to yet another embodiment, a method of commanding torque to an actuator of a hybrid vehicle includes determining an estimated torque ratio between input and output shafts of a multi-speed transmission; determining a minimum torque ratio between an impeller of a torque converter and the output shaft based on a power loss of the torque converter; and, in response to the estimated torque ratio being less than the minimum torque ratio during a shift of the transmission, commanding torque to the actuator based on a driver-demanded wheel torque and the minimum ratio.

BRIEF DESCRIPTION OF THE DRAWINGS

FIG. 4 illustrates a control diagram for determining torque converter power loss.

FIG. 5 illustrates a control diagram for determining a minimum torque ratio of a transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
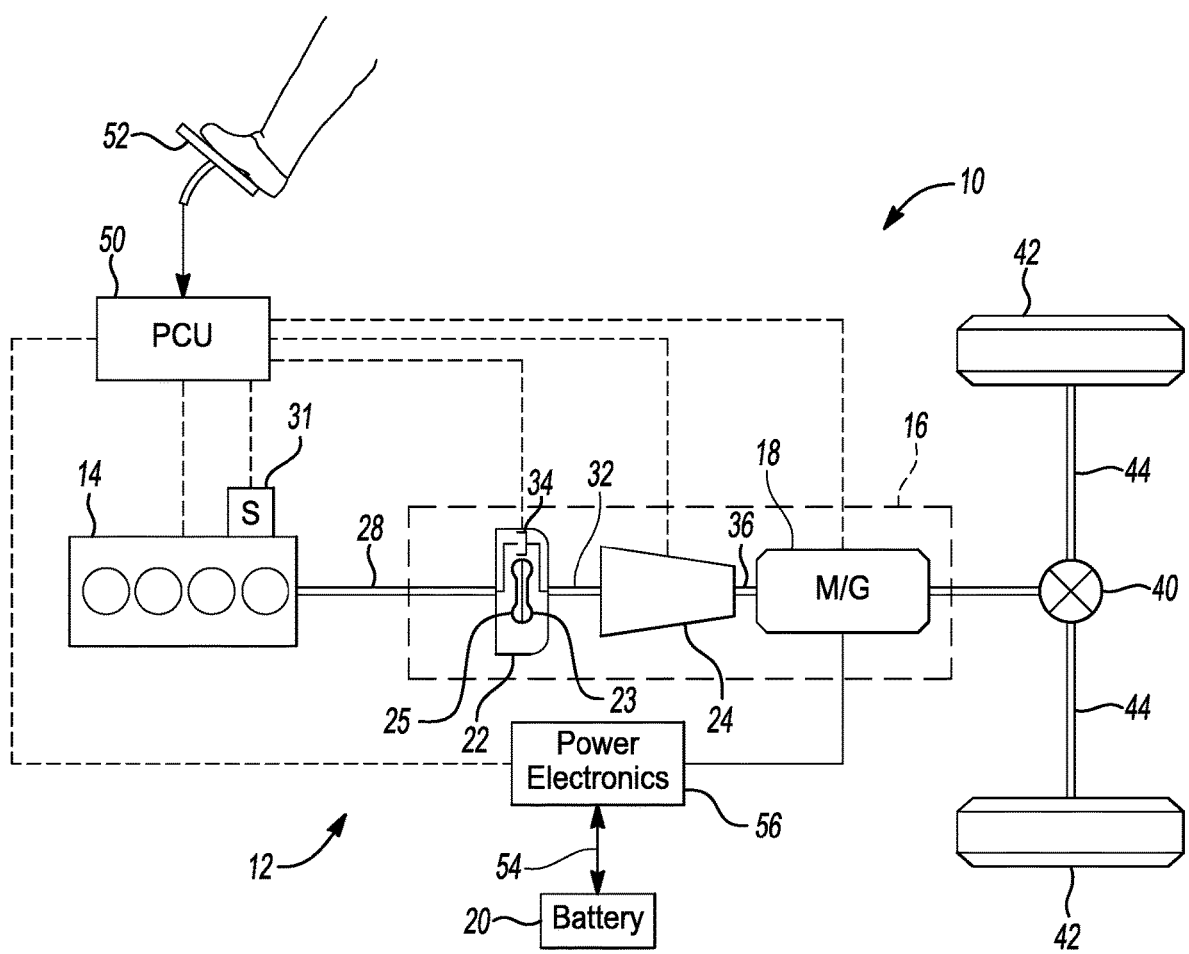
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. The illustrated vehicle 10 is sometimes referred to as a P3 hybrid. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, the vehicle 10 also includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to torque converter 22. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

The crankshaft 28 is connected to the torque converter 22. The torque converter 22 includes an impeller 23 fixed to crankshaft 28 and a turbine 25 fixed to a transmission input shaft 32. The torque converter 22 provides a hydraulic coupling between crankshaft 28 and the transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements may be hydraulic and operated according to hydraulic pressure regulated by solenoids. The solenoids are in communication with one or more controllers and send and receive date therebetween. The friction elements are controllable through a shift schedule that connects and disconnects certain elements of the gear sets to control the speed and torque ratios between the transmission output shaft 36 and the transmission input shaft 32. The gearbox 24 may have eight speeds including first through eighth gears in one example, but many others a known. In this example, eighth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

In the illustrated embodiment, the M/G 18 is downstream of the gearbox 24 and is coupled to the output shaft 36. The M/G 18 includes a rotor that is fixed to a rotor shaft fixedly coupled to, or integral with the output shaft 36. As shown in the representative embodiment of FIG. 1, the output of the M/G 18, e.g., shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

A separate starter motor 31 can be selectively engaged with the engine 14 to rotate the engine to allow combustion to begin. Once the engine is started, the starter motor 31 can be disengaged from the engine 14 via, for example, a clutch (not shown) between the starter motor 31 and the engine 14. In one embodiment, the starter motor 31 is a belt-integrated starter generator (BISG). In one embodiment, the engine 14 is started by the starter motor 31. Once the engine has started and is brought up to speed with the M/G 18, gearbox can couple the engine 14 to the M/G 18 to allow the engine to provide drive torque. In another embodiment, the starter motor 31 is not provided and, instead, the engine 14 is started by the M/G 18.

The powertrain 12 further includes one or more controllers 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 and the engine 14 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from the engine 14, the M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to request a demanded torque, power, or drive command to propel the vehicle. In general, depressing and releasing the pedal 52 generates an accelerator-pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the torque converter bypass clutch 34. The torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, engine is started and commanded to produce torque that is transmitted to the gearbox 24. When the engine 14 alone provides the torque necessary to propel the vehicle, this operation mode may be referred to as the "engine mode," "engine-only mode," or "mechanical mode." The M/G 18 may assist the engine 14 by providing additional power to turn the shaft 36. This operation mode may be referred to as a "hybrid mode," an "engine-motor mode," or an "electric-assist mode."

To drive the vehicle with the M/G 18 as the sole power source, the power flow remains the same except the transmission is shifted to NEUTRAL to isolate the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the wheels 42. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided upstream of the gearbox 24 (e.g., a P2 configuration). Other configurations are contemplated without deviating from the scope of the present disclosure.

The hybrid powertrain 12 of vehicle 10 has multiple actuators, e.g. the engine and the motor, that may be used to produce a given driver-demanded torque. These actuators may be controlled by different control modules that each communicate with the VSC over a data bus, e.g., CAN. Vehicle may be configured to command the driver-demanded torque at various locations of the powertrain 12 such the engine 14, the output shaft 36, or at the wheels 42. In configurations with an M/G downstream of the transmission, a wheel-torque based approach may be preferred. In a wheel-torque approach the accelerator-pedal position signal is used to determine a driver-demanded torque at the driven wheels (driver-demanded wheel torque). In one embodiment, the controller is programmed with one or more lookup tables that determine the driver-demanded wheel torque based on vehicle speed and the accelerator-pedal position.

The controller includes an arbitrator that determines the torque split between the engine 14 and the M/G 18. The arbitrator may determine the torque split in the wheel domain and then one or more other control modules may convert to the engine and motor domain to determine the torque commands to the individual actuators.

In a wheel-torque based powertrain system, in order to determine the engine (or other upstream actuator) torque requests it is essential to know the correct torque ratio across the transmission 24 during all operating region of the vehicle. In addition, driver-assistance systems can command a wheel-torque request to the vehicle controls system. In order to honor the wheel-torque request from the driver-assistance systems, it is required to have a plausible torque ratio to convert from the wheel domain to the actuator domain. A challenge is to determine a plausible torque ratio that is used to convert the wheel torque into actuator torque. Used herein, unless otherwise noted, the speed ratio is the input divided by the output, and the torque ratio is the output divided by the input. In the illustrated embodiment of FIG. 1, the engine is upstream of the transmission and equation 1 can be used to convert between engine and wheel torque, where TSS is the transmission input shaft speed and OSS is the transmission output shaft speed. f(TSS/Engine speed) represents the estimated torque converter torque ratio when the torque converter is open or slipping.

$$\text{Torque ratio} = (TSS/OSS) \times \text{Gear efficiency} \times \text{Final Drive Ratio} \times f(TSS/\text{Engine speed}) \quad \text{Eq. 1}$$

The M/G 18, being downstream of the gearbox 24, can be converted to the wheel domain by multiplying by the final drive ratio.

The controller 50 may use various sources of information to determine the torque ratio/speed ratio of the transmission 24. The transmission may include one or more speed sensors that measure the input shaft 32, the output shaft 36, or both. The speed sensors are configured to output data indicative of a measured speed. The controller may interpret this data and generate an estimated speed of the input shaft 32 (TSS) and an estimated speed of the output shaft 36 (OSS).

The controller may verify the readings of the sensors (e.g., TSS and OSS) using other information such as the predefined speed ratios of the gears. For example, first gear may have a predefined speed ratio of 3:1. When the transmission is in a gear, determining the torque ratio is straight forward and is equal to the ratio of that gear, which is set by the physical form of the planetary gear sets. Thus, it is straightforward to valid the sensors when in gear. However, during certain gearshifts it is difficult to verify the plausibility of the TSS and OSS. A TSS estimate which reads low will cause the gearbox ratio to decrease but the converter torque ratio to increase. Conversely, a TSS estimate which fails high will cause the gearbox ratio to increase but the converter ratio to decrease. Accounting for the combination of these effects is difficult. A torque ratio being lower than actual torque ratio may result in over delivery of torque and vice versa. Thus, an incorrect torque ratio may lead to incorrect torque command that may result in drivability or performance issues.

To provide redundancy, this disclosure sets forth a methodology and controls for determining when the TSS or OSS is faulted resulting in a TSS/OSS error or a torque converter torque ratio error during a gearshift to prevent incorrect delivery of torque in a wheel-domain torque control. The controller is programmed to determine a minimum torque ratio that forms the lower bound of the torque ratio between input shaft 32 and the output shaft 36. If the torque ratio calculated in Eq. 1 drops below the minimum torque ratio during a gear shift, the controller identifies a fault and uses the minimum torque ratio to convert the driver-demanded wheel torque to the commanded engine torque during the gearshift. The controller may also set an upper bound on the torque ratio. The upper bound may be the maximum of the current gear ratio and the target gear torque ratio multiplied by the estimated torque converter torque ratio.

Figure 2:
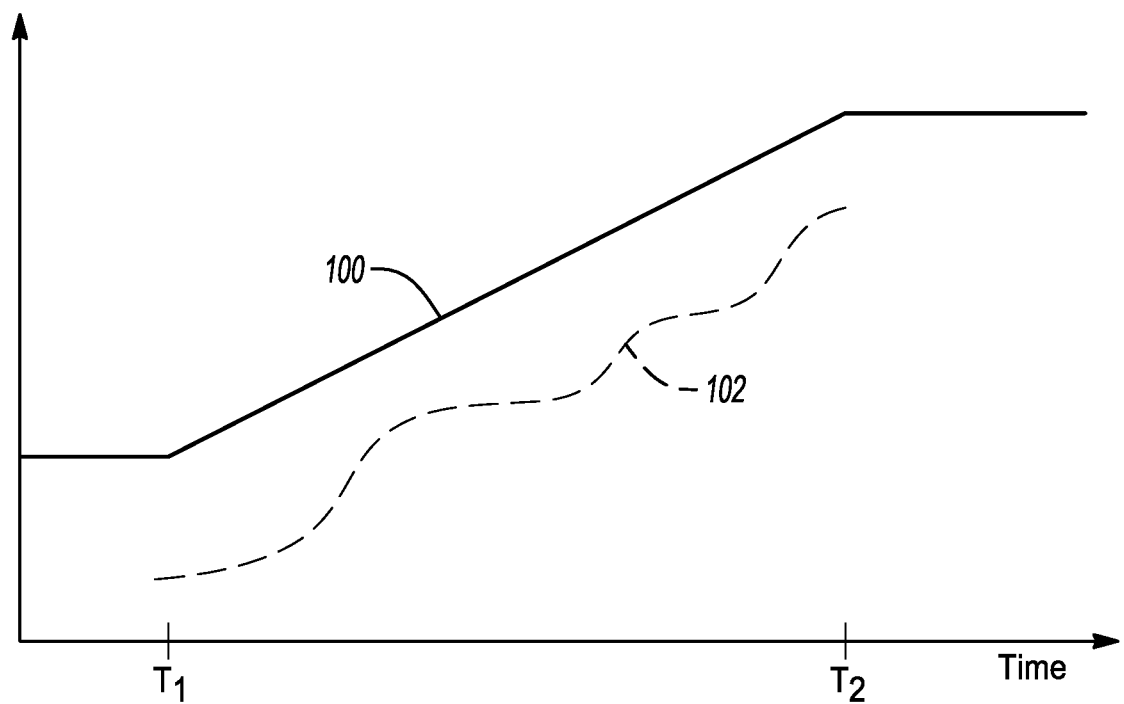
FIG. 2 is a plot showing an estimated speed ratio and a minimum torque ratio during a normal downshift.

FIG. 2 illustrates a plot of an example downshift when the sensors are functioning properly. In this example, converter is locked and hence the torque converter torque ratio is one, the gear efficiency is 100 percent, and final drive ratio (FDR) is excluded for simplicity. Prior to time T1, the transmission is in eight gear, and at time T1, the transmission begins to shift from the current gear (eighth gear) to a target gear (e.g., fourth gear). (The "current gear" is sometimes referred to as the "offgoing gear," and the "target gear" is sometimes referred to as the "oncoming gear.") Trace 100 shows the speed ratio of the transmission between the TSS/OSS. The speed ratio 100 is constant prior to time T1 when fully in eight gear and after time T2 when in fourth-gear. During the shift, which occurs between times T1 and T2, the speed ratio 100 varies as the transmission downshifts. During the shift, the speed ratio 100 may be determined by dividing a measured turbine shaft speed divided by a measured transmission output shaft speed. The vehicle controller may also calculate a minimum torque ratio 102 that is based on torque converter loss. Unlike the speed ratio 100, which is the input divided by the output, the torque ratio 102 is the output divided by the input. The minimum torque ratio 102 illustrates the minimum possible torque ratio that may occur during the shift and is a lower bound. That is, the torque ratio calculated based on the speed ratio 100 should never be less than the minimum torque ratio 102. If such a calculation occurs, an error/fault is most likely present in the system, e.g., faulty speed sensor, incorrect determination of torque Converter state, etc. In this example, the speed ratio 100 is always greater than the lower bound 102 and the system is most likely functioning properly.

Figure 3:
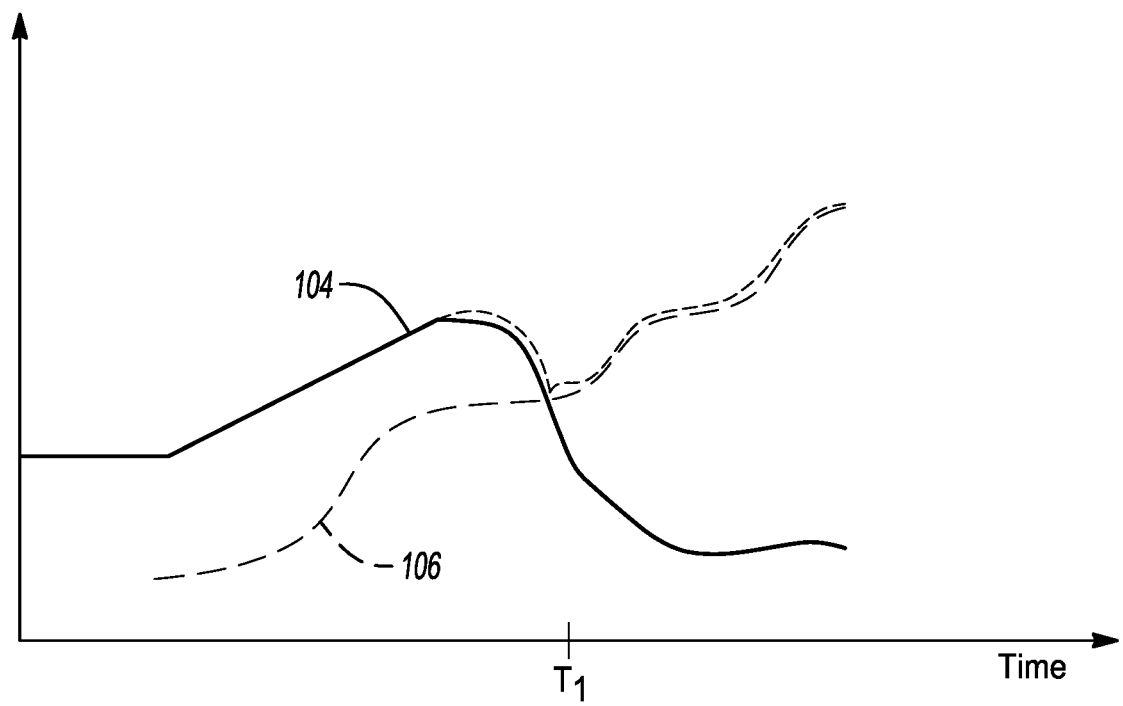
FIG. 3 is a plot showing a estimated speed ratio and a minimum torque ratio during a downshift that occurs concurrent with a fault condition.

In contrast to FIG. 2, FIG. 3 illustrates another downshift from eight gear to fourth gear in which the calculated speed ratio 104 drops below the minimum torque ratio 106 at time T1. This indicates a fault/error in one or more components of the system responsible for determining the speed ratio. In response to the measured speed ratio dropping below the minimum torque ratio, the vehicle controller uses the minimum torque ratio to calculate actuator torque during the shift. Once the shift is complete and fourth gears fully engaged, the controller may then use the known gear ratio of fourth gear to determine the appropriate torque ratio for controlling the actuators. The vehicle may also enter diagnostic mode to determine the source of the error. It should be noted, that transmission controls cannot detect either a fault in the input and output shaft speed to the transmission during a shift since there is no redundancy in the planetary gearset relationships. By utilizing the minimum torque ratio based on torque converter power loss, a fault can be detected mid shift rather than waiting until the shift completes in order to determine that a fault has occurred.

Referring to FIG. 4, the minimum torque ratio based on torque converter power loss can be calculated using a K-factor converter model. The power into the converter (impeller speed times impeller torque, is subtracted from the power out of the converter, turbine speed times turbine torque. This relationship can be scheduled as a function of turbine speed and turbine torque. The inputs to the table may be converted to vehicle speed and wheel torque (same inputs as driver demand, by creating per gear power loss maps to be stored in memory of the controller. During transmission shifts, the system can set the maximum power loss to the larger power loss between the current gear and the target gear. For each gear, a calculation box 110 may receive wheel torque and vehicle speed that are used to calculate the power loss for that gear. At box 112, the controller selects the power losses for the current and target gears which are output to box 114 that outputs the maximum of the current and target gears that are output as the maximum power loss 116.

The maximum power loss table may be used to calculate the minimum torque ratio that was previously shown in FIGS. 2 and 3. The calculation relies on a validated vehicle speed estimate and a validated engine speed estimate. Both of these signals may be measured redundantly. In some implementations, the vehicle may approximate the torque ratio of the transmission gearbox during shifting with the transmission gearbox speed ratio. This assumes the transmission gearbox has no additional losses during a transmission shift. In doing so, only the losses across the torque converter need to be considered. One advantage of this concept is that it is not require knowledge of the torque converter state which is very difficult to redundantly observe during transmission shifting.

FIG. 5 illustrates a control diagram 150 for calculating the minimum torque ratio according to one or more embodiments. The controls may receive a measured vehicle speed 152, a commanded wheel torque 154, final drive ratio 156 and calculate value 158 that is the product of vehicle speed and final drive ratio. The wheel torque 154 and the final drive ratio are divided at box 160 to determine the torque at the output shaft of the transmission. Box 162 receives the output shaft torque and the calculation 158 and multiplies them to output the power at the output shaft of the transmission. The vehicle speed 152 and the commanded wheel torque 154 are input into box 164 to calculate the maximum torque converter power loss. The outputs of box 164 and 162 are input into summation box 166 to calculate the power at the impeller of the torque converter. The impeller power is divided by the engine speed at operation 168 to determine the torque at the impeller. The output shaft torque is divided by the impeller torque to determine the minimum torque ratio at box 170. The minimum torque ratio 170 may be used as a lower boundary during the shift as shown in FIG. 3. The minimum torque ratio 170 may also be used similarly during an upshift of the transmission.

Figure 6:
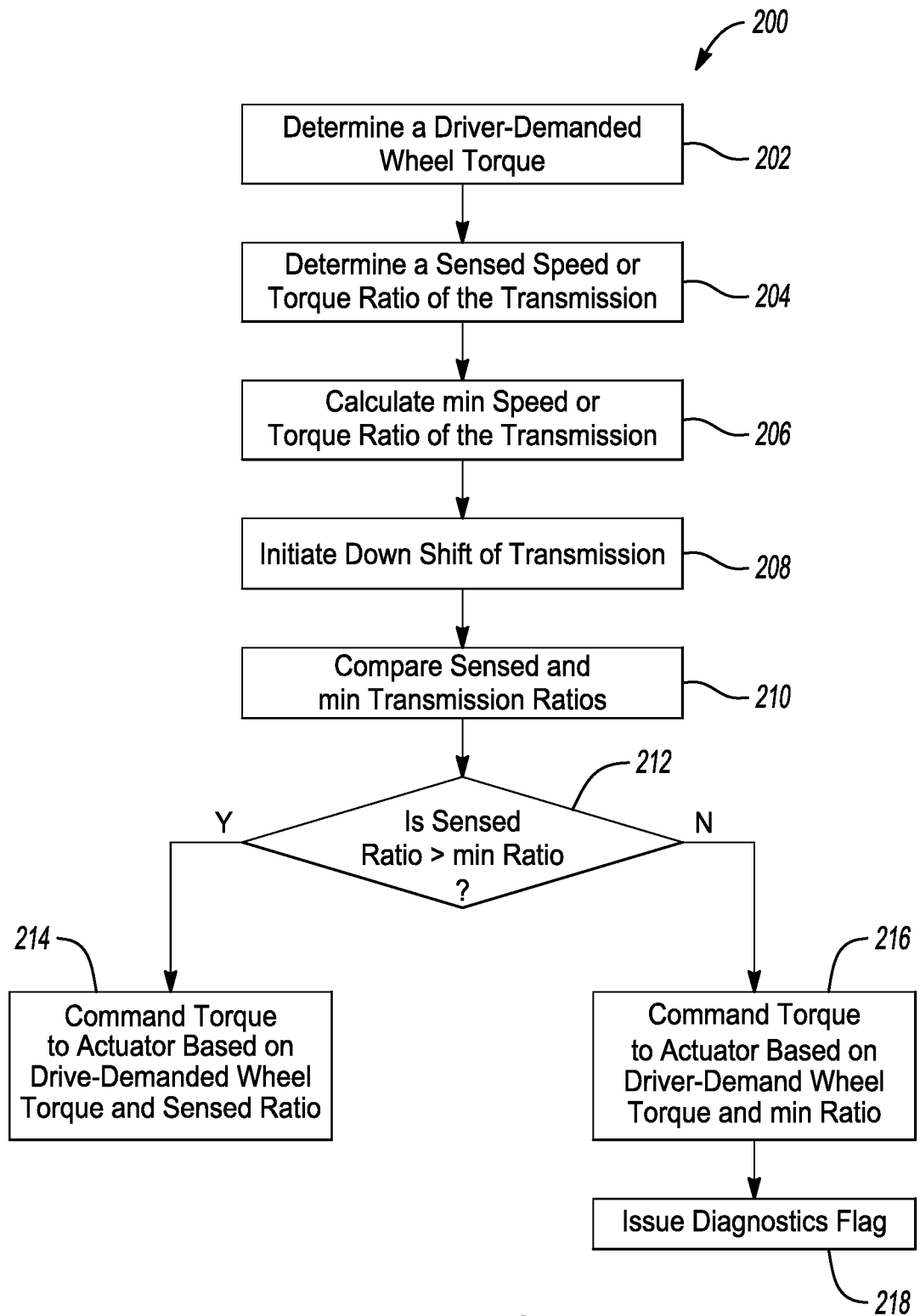
FIG. 6 is a flow chart of controls/methods of performing a transmission shift.

Referring to FIG. 6, a flow chart of controls/method for calculating actuator torque, e.g., engine torque, during a shift is shown. At operation 202, the controller determines a driver-demanded wheel torque. At operation 204, the controller determines an estimated torque ratio between the impeller and the transmission output shaft. The torque ratio may be the output shaft torque divided by the impeller torque. The transmission may include speed sensors that are used to measure at least the speeds of the transmission input and output shafts. Alternatively, the shaft speeds may be inferred based on other measured values. These speed may be used to calculate the estimated torque ratio.

In operation 206, the controller calculates a minimum torque ratio between the impeller and the transmission output shaft. This ratio is used as a lower bound during upshifting or downshifting of the transmission as discussed above. As discussed above, the minimum torque ratio may be calculated based on torque converter power loss.

In operation 208, the controller initiates a shift of the transmission. During the shift, the transmission controller controls solenoids, such as by modulating current signals, which in turn controls capacities of associated clutches that engage and release elements of planetary gear sets thus establishing different speed ratios. During a shift, the transmission controller determines a target gear based on the pedal position signal and other factors. The shift is initiated by engagement of the clutches associated with the target gear and the release of clutches that are not associated with the target gear. In response to a shift, the controller compares the estimated and minimum torque ratios at operation 210. At operation 212, the controller determines if the estimated torque ratio is greater than the minimum torque ratio. If yes, the estimated ratio is most likely accurate, and is used to calculate the torque commanded to the actuator(s) that are upstream of the transmission. In the illustrated embodiment of FIG. 1, this would be the engine 14. If yes at operation 212, control passes operation 214 and the controller commands torque to the actuator, e.g. the engine, based on the driver-demanded wheel torque and the estimated torque ratio. Equation 2 may be used to determine the actuator torque without regard for losses.

$$\text{Actuator Torque} = \text{Wheel Torque}/[\text{FDR} \times \text{Estimated Torque Ratio}] \qquad \text{Eq. 2}$$

If no at operation 212, control passes operation 216 and the controller commands torque to the actuator based on the driver-demanded wheel torque and the minimum torque ratio. Equation 2 may be used to determine the actuator torque without regard for losses.

$$\text{Actuator Torque} = \text{Wheel Torque}/[\text{FDR} \times \text{Minimum Torque Ratio}] \qquad \text{Eq. 3}$$

As discussed above, a fault is most likely occurring when the estimated ratio is less than the minimum ratio. As such, the controller issues a diagnostics flag at operation 218 in response to the estimated ratio being less than the minimum ratio. The controller may then perform additional diagnostics once the transmission is in one of the gears, i.e., not shifting, so that the predetermined gear ratios may be used to determine the source of the fault.

Figure 7:
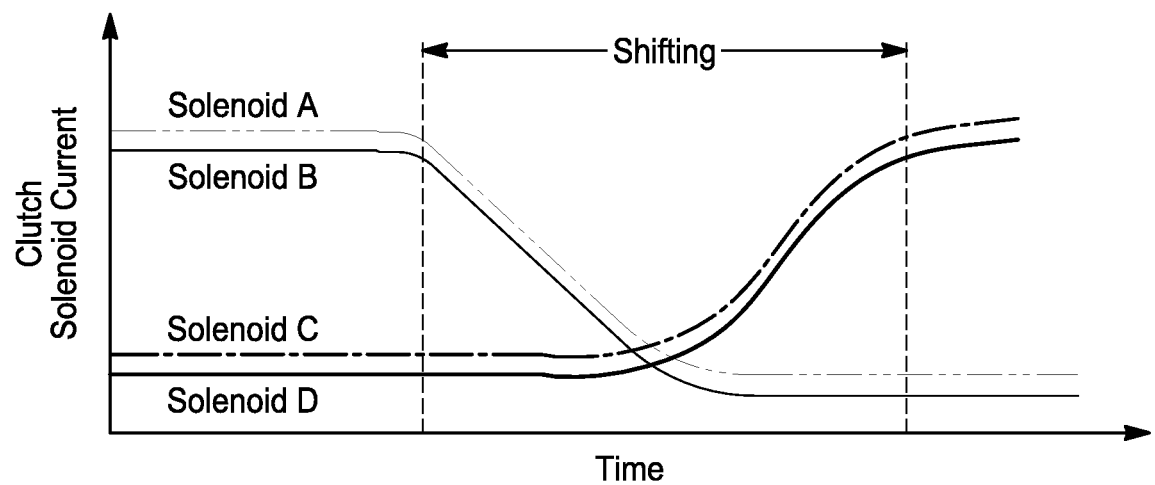
FIG. 7 is a plot of solenoid currents during a transmission shift.

During a transmission shift, it is possible for the transmission to change the target gear ratio from the gear ratio that was previously commanded based on the pedal input, engine speed, etc. This may occur, for example, due to a change in the driver input or other factors. Thus, it may be desirable to monitor the target gear and the intent of the transmission based on the solenoids that are actuated during the shifting event. Observing the solenoids may be used to confirm that the transmission is shifting to the previously requested target gear or if it is instead shifting to another gear. FIG. 7 illustrates an example charge of solenoid currents for a hypothetical transmission shift. In this example, it only requires two clutches to establish a gear ratio, however, in practice, the transmission may require three or four clutches to establish a gear ratio. In this example, solenoids A and B are associated with the current (offgoing) clutches and solenoids C and D are associated with the target (oncoming) clutches. The controller may measure the current commanded to the solenoids, and based on these currents, determine when clutches are being engaged and disengaged. In this example, the measured currents of solenoids A and B are decreasing indicating that these clutches are being released. On the other hand, the current of solenoids C and D are increasing indicating that these clutches are being engaged. Based on this information, the controller may determine the gears associated with the shift. If the target gear suddenly changes, monitoring the solenoids allows the controller to select a new target gear based on the current of the solenoids. For example, the controller may be programmed to, in response to the shift, (i) verify engagement of clutches associated with the target gear based on first current signals received from solenoids associated with the clutches, (ii) if the first current signals indicate the clutches are not being engaged, redetermine the target gear to be another gear of the transmission based on other current signals received from other solenoids of the transmission, and if the first current signals indicate the clutches are being engaged, maintain the target gear.

Bounding may also be used to set an upper limit during shifting to prevent the incorrect delivery of torque. The upper bound on the speed ratio of the transmission may be equal to the maximum of the current gear torque ratio and the target gear torque ratio, multiplied by an estimated torque converter torque ratio. By utilizing these bounds, the vehicle 10 can be properly controlled during transmission shift even when a fault occurs mid shift.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a multi-speed transmission including an input shaft and an output shaft;
an actuator; and
a torque converter including an impeller selectively coupled to the actuator and a turbine coupled to the input shaft; and
a controller programmed to:
in response to an estimated torque ratio between the impeller and output shaft of the transmission being less than a minimum torque ratio between the impeller and output shaft of the transmission during a shift of the transmission, command torque to the actuator based on a driver-demanded wheel torque and the minimum torque ratio, and
in response to the estimated torque ratio exceeding the minimum torque ratio during the shift of the transmission, command another torque to the actuator based on the driver-demanded wheel torque and the estimated torque ratio.

2. The vehicle of claim 1, wherein the minimum torque ratio is based on a power loss through the torque converter such that the minimum torque ratio decreases as the power loss increases.

3. The vehicle of claim 2, wherein the power loss is further based on the driver-demanded wheel torque, a speed of the vehicle, and a gear of the transmission.

4. The vehicle of claim 3, wherein the power loss is a maximum of (i) a first power loss calculated for an offgoing gear of the shift and (ii) a second power loss calculated for an oncoming gear of the shift.

5. The vehicle of claim 4, wherein the controller is further programmed to identify the offgoing gear and the oncoming gear based on clutch-solenoid current signals.

6. The vehicle of claim 1, wherein the controller is further programmed to receive measured speeds of the input and output shafts of the transmission, wherein the estimated torque ratio is based on the measured speeds of the input and output shafts.

7. The vehicle of claim 1, wherein the actuator is an internal combustion engine.

8. The vehicle of claim 1 further comprising a second actuator coupled to the output shaft of the transmission.

9. The vehicle of claim 8, wherein the actuator is an internal combustion engine and the second actuator is an electric machine.

10. The vehicle of claim 1, wherein the controller is further programmed to, in response to the estimated torque ratio being less than the minimum ratio, issue a diagnostics flag.

11. A vehicle comprising:
an actuator;
a multi-speed transmission including an input shaft, an output shaft, and clutches selectively engageable to establish power flow paths between the input and output shafts;
a torque converter including an impeller selectively coupled to the actuator and a turbine coupled to the input shaft; and
a controller programmed to:
receive a driver-demanded wheel torque,
command the transmission to shift from a current gear to a target gear,
in response to the shift, (i) receive current signals from solenoids associated with one or more of the clutches to verify engagement of the target gear, (ii) determine a first power loss through the torque converter for the current gear, (iii) determine a second power loss through the torque converter for the target gear, and (iv) determine a minimum torque ratio between the impeller and the output shaft of the transmission based on a maximum of the first and second power losses, and
in response to an estimated torque ratio between the impeller and the output shaft being less than the minimum torque ratio during the shift of the transmission, command torque to the actuator based on the driver-demanded wheel torque and the minimum torque ratio.

12. The vehicle of claim 11, wherein the controller is further programmed to, in response to the estimated torque ratio exceeding the minimum torque ratio during the shift, command another torque to the actuator based on the driver-demanded wheel torque and the estimated torque ratio.

13. The vehicle of claim 11, wherein the transmission further includes speed sensors configured to measure speeds of the input and output shafts of the transmission, wherein the estimated torque ratio is based on the speed sensors.

14. The vehicle of claim 11, wherein the estimated torque ratio is based on a speed of the input shaft, a speed of the output shaft, and an estimated torque ratio of the torque converter.

15. The vehicle of claim 11, wherein the power loss is based on the driver-demanded wheel torque and a speed of the vehicle.

16. The vehicle of claim 11 further comprising a second actuator coupled to the output shaft of the transmission.

17. The vehicle of claim 16, wherein the actuator is an internal combustion engine and the second actuator is an electric machine.

18. A method of commanding torque to an actuator of a hybrid vehicle, the method comprising:

determining an estimated torque ratio between input and output shafts of a multi-speed transmission;

determining a minimum torque ratio between an impeller of a torque converter and the output shaft based on a power loss of the torque converter; and in response to the estimated torque ratio being less than the minimum torque ratio during a shift of the transmission, commanding torque to the actuator based on a driver-demanded wheel torque and the minimum ratio.

19. The method of claim 18 further comprising, in response to the estimated torque ratio exceeding the minimum torque ratio during the shift, commanding another torque to the actuator based on the driver-demanded wheel torque and the estimated ratio.

20. The method of claim 18, wherein the power loss is based on the driver-demanded wheel torque, a speed of the vehicle, and a gear of the transmission.

* * * * *